(No Model.)

J. J. BAUSCH.
LENS BLOCKING.

No. 407,990.  Patented July 30, 1889.

OLD STYLE
A  HOLDER
C
GRINDER

MOLD

HOLDER
GRINDER

Witnesses
W. W. Mortimer
W. R. Kennedy

Inventor
J. J. Bausch
By Phil. T. Dodge
Attorney

UNITED STATES PATENT OFFICE.

JOHN J. BAUSCH, OF ROCHESTER, NEW YORK.

LENS-BLOCKING.

SPECIFICATION forming part of Letters Patent No. 407,990, dated July 30, 1889.

Application filed April 20, 1889. Serial No. 307,970. (No model.)

*To all whom it may concern:*

Be it known that I, JOHN J. BAUSCH, of Rochester, in the county of Monroe and State of New York, have invented certain Improvements in Lens-Blocking, of which the following is a specification.

My invention has reference to that mode of grinding lenses in which a series of glass blanks or lenses ground on one side are distributed over and cemented to the surface of a spherical support technically known as a "block," and carried thereby over the surface of a correspondingly-shaped grinding-surface.

The invention is applicable alike to cases in which the block is convex and the grinding-shell concave in order to produce convex lenses, and to cases in which the block is concave and the shell or grinder convex to produce concave lenses. Heretofore it has been customary to construct the block or support with a smooth spherical surface of pitch or similar material on which the lenses were cemented, the accuracy of this adjustment, known as "blocking," depending upon the skill of the operator.

In order that the lenses may be ground properly and of equal thickness at opposite edges, they must be accurately blocked, each with the plane of its periphery at right angles to a line passing from its center to the center of the spherical block, or, in other words, so that the radii of the block will be perpendicular to the faces of the respective lenses and coincident with their focal axes.

Now, my invention is directed to the speedy and accurate blocking of the lenses or blanks to the block in the positions required; and to this end it consists, essentially, in a block the surface of which is formed or provided with a series of facets shaped and located in such manner as to admit of the lenses or blanks being applied thereto and supported thereby. The block may be produced in any suitable manner; but I find that the best and, as I believe, the only practical method is to cast them in molds, the inner surfaces or facets of which are counterparts of the required blocks.

Figure 1:
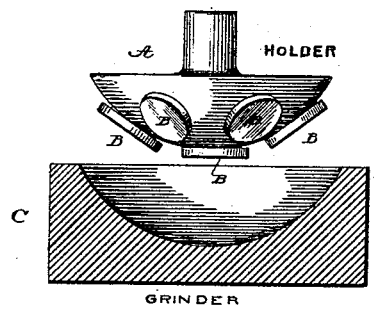
Figure 2:
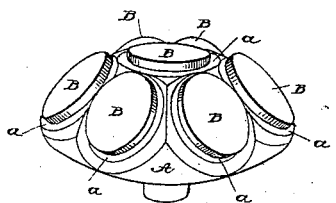
Figure 3:
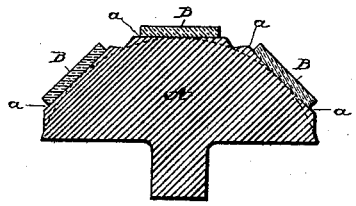
Figure 4:
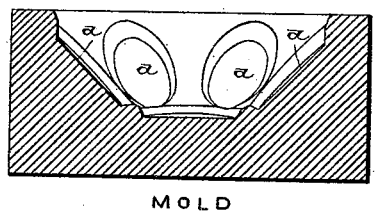
Figure 5:
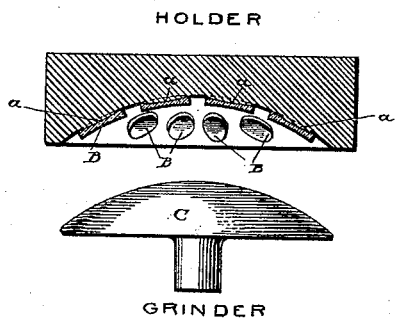

In the accompanying drawings, Figure 1 is a sectional view illustrating the method of grinding lenses. Fig. 2 is a perspective view of a convex block on my plan. Fig. 3 is a vertical cross-section of the same. Fig. 4 is a vertical cross-section of the mold in which it was formed. Fig. 5 is a cross-section through a concave block on my plan, together with the grinder used in connection therewith.

Referring to Fig. 1, A represents a holder of pitch or similar material, having a spherical surface; B B, a series of glasses or lenses cemented to the surface, and C a concave grinding-shell, which is commonly made of iron and against which the lenses are ground in the presence of emery or other abrasive material by giving the block a universal motion therein.

In carrying my invention into effect I form the block A, as shown in Figs. 2 and 3, with the series of facets *a*, each of which has its outer surface adapted to receive and to closely fit the surface of the blank or lens to be ground. The lenses are applied in a warm state to these facets formed by pitch, shellac, or other adhesive materials such as are commonly used.

In Figs. 2 and 3 I have represented the block as employed to support lenses while they are being ground to a convex form on the outer or exposed side.

In Fig. 5 the block is made of a concave form with the facets *a* to support the lenses *b*. In this case the grinder C is made with a convex surface, so that it will produce concave surfaces on the lenses.

Fig. 4 represents a metal mold adapted for the production of the block shown in Figs. 2 and 3. It will be observed that this mold is formed with a concave spherical surface having therein a series of facets *d*, formed and distributed so that when the pitch is cast therein it will produce a block in the required form. The facets of the blocks may be given more or less convexity or concavity, as the shape of the lenses to be ground may require.

The essence of the invention resides in providing the mold and holder with the facets or surfaces adapted to the curve of the lenses or glasses to be ground, and it may be changed in form or construction at will provided this peculiarity is retained.

The facets should be countersunk below the spherical surface of the mold either convex or concave, so that the undisturbed portion of the mold will leave a continuous formation of ridges or elevations, which in the block consisting of pitch, shellac, or other adhesive material will form equivalent depressions, so that the facets in the block will be elevated above the common spherical surface, and thus give the utmost freedom for abrasive action during the process of grinding and polishing. In other words, it becomes unnecessary to remove the superfluous pitch, which is a serious hinderance in the operations as now generally followed.

Having thus described my invention, what I claim is—

1. A holder to support a series of lenses while being ground, the same having in general outline a spherical form with a series of facets $a$ thereon to sustain the respective blanks or lenses.

2. A holder for lenses while grinding the same, consisting of a spherical body with a series of distinct elevated facets, each having its face formed to fit the surface of a corresponding lens.

In testimony whereof I hereunto set my hand, this 6th day of April, 1889, in the presence of two attesting witnesses.

JOHN J. BAUSCH.

Witnesses:
FREDERICK COOK,
EUGENE H. SATTERLEE.